(12) United States Patent
Tokuyasu et al.

(10) Patent No.: US 7,587,938 B2
(45) Date of Patent: Sep. 15, 2009

(54) THERMAL TYPE FLOW METER INCLUDING A SECONDARY HEATING DEVICE TO SUPPRESS HEAT TRANSFER

(75) Inventors: Noboru Tokuyasu, Hitachinaka (JP); Daisuke Terada, Hitachinaka (JP); Kaori Kashio, Hitachinaka (JP); Toshiki Otsuki, Hitachinaka (JP); Katsuaki Fukatsu, Naka (JP); Hiroshi Onuki, Hitachi (JP); Jun Kubo, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/657,612

(22) Filed: Jan. 25, 2007

(65) Prior Publication Data

US 2007/0220968 A1    Sep. 27, 2007

(30) Foreign Application Priority Data

Mar. 14, 2006    (JP) .............................. 2006-069379

(51) Int. Cl.
    *G01F 1/68* (2006.01)
(52) U.S. Cl. ................................ 73/204.27; 73/204.15
(58) Field of Classification Search ............. 73/204.15, 73/204.26, 204.27
    See application file for complete search history.

(56) References Cited

U.S. PATENT DOCUMENTS

| | | | | |
|---|---|---|---|---|
| 4,448,070 A | * | 5/1984 | Ohyama et al. | 73/204.21 |
| 4,587,842 A | * | 5/1986 | Handtmann | 73/204.14 |
| 5,003,822 A | * | 4/1991 | Joshi | 73/204.23 |
| 5,282,385 A | * | 2/1994 | Kayano et al. | 73/204.27 |
| 5,291,781 A | * | 3/1994 | Nagata et al. | 73/204.26 |
| 5,635,635 A | * | 6/1997 | Tsukada et al. | 73/202.5 |
| 6,516,785 B1 | * | 2/2003 | Nakada et al. | 73/204.26 |
| 2007/0251315 A1 | * | 11/2007 | Sukegawa et al. | 73/204.27 |

FOREIGN PATENT DOCUMENTS

| | | | | |
|---|---|---|---|---|
| JP | 62098219 A | * | 5/1987 | |
| JP | 5-16530 | | 3/1993 | |
| JP | 2003337056 A | * | 11/2003 | |

* cited by examiner

*Primary Examiner*—Harshad Patel
(74) *Attorney, Agent, or Firm*—Mattingly & Malur, P.C.

(57) ABSTRACT

A thermal gas-flow measuring instrument has a first heating resistor placed in the gas to be measured. A temperature sensing resistor is positioned upstream or downstream of the first heating resistor and generates signals relating to the flow rate. Between the first heating resistor and the support for supporting the first heating resistor is a second heating resistor that is electrically insulated from the first heating resistor. The second heating resistor suppresses the heat being transferred from the first heating resistor to the support. A control circuit controls the temperatures of the first heating resistor and the second heating resistor so that the operational temperature range of the second heating resistor or the temperature range at the joint section between the first heating resistor and the second heating resistor is at or above the temperature at which water droplets evaporate to disappear by film boiling.

20 Claims, 10 Drawing Sheets

PRIOR ART

FIG. 10

PRIOR ART

FLOW OF GAS

FLOW OF GAS

THERMAL TYPE FLOW METER INCLUDING A SECONDARY HEATING DEVICE TO SUPPRESS HEAT TRANSFER

BACKGROUND OF THE INVENTION

1. Field of the Invention

The present invention relates to a thermal gas-flow measuring instrument which measure flow rate of fluid to be measured with the use of a heating resistor and a temperature sensing resistor.

2. Description of the Related Art

Regarding instrument to measure flow rate of fluid to be measured based on the rate of heat transfer from a heating resistor to the fluid, there is a known technology disclosed in JP-B-5-16530(Patent Document 1). The flow detector described in Patent Document 1 has a first heating element detecting the flow velocity of the fluid, a second heating element surrounding the first heating element, and a fixed temperature difference control circuit which keeps the temperature difference between the first heating element and the second heating element at a specified value or zero. The second heating element is supported by a supporting member.

The technology described in Patent Document 1 uses the second heating resistor to suppress the occurrence of temperature drift by suppressing the heat releasing from the electrode lead wire connected to the first heating resistor to the support side.

SUMMARY OF THE INVENTION

When a thermal gas-flow measuring instrument is used in an exhaust atmosphere, nonvolatile mater consisting essentially of dry soot, in the exhaust, deposits on the support supporting the heating resistor of the flow measuring instrument. Since the support of the heating resistor is kept at a certain temperature level by the heat transferred from the heating resistor, the heat transferring resistance between the support and the gas varies from the heat transferring resistance before depositing the nonvolatile matter, so that the deposited nonvolatile matter adversely affects the output of the instrument.

To this point, there are several methods for avoiding the deposition of dry soot on the support. According to one method, an obstacle is arranged at upstream side of the support in order to prevent the impingement of the gas. According to the other method, a water-repellent or oil-repellent anti-adhesion is coated onto the support.

The above-described method, however, raise secondary problems such as life of the obstacle and of the coating, and these problems have to be solved.

In this regard, the technology disclosed in Patent Document 1 is an expectedly very effective method.

The technology described in Patent Document 1, however, emphasizes to maintain the temperature difference between the first heating element and the second heating element at a certain value on the fundamental concept of suppressing the temperature drift, being not considered the drift of the absolute temperature of the heating element.

That is, the avoidance of pollution, specifically the pollution caused by the dry soot in exhaust environment, cannot be attained solely by keeping the temperature difference between the first heating element and the second heating element at a constant value. Since the absolute temperature of the heating element is a critical control variable, it is necessary to keep the heating resistor at higher temperature than the temperature required for ordinary intake gas-flow measurement.

An object of the present invention is to realize a thermal gas-flow measurement instrument which can suppress the influence on the output characteristics, caused by the pollution of the support of the heating resistor, independent of the use environment.

The thermal gas-flow measuring instrument according to the present invention has a heating resistor placed in the target gas, and a temperature sensing resistor positioned at upstream side or downstream side of the heating resistor, thereby measuring the flow rate of the gas. The thermal gas-flow measuring instrument further has suppress means for suppressing the transfer of heat from the heating resistor to the support, the suppress means being positioned between the heating resistor and the support for supporting the heating resistor.

In the above thermal gas-flow measuring instrument, when the above heating resistor is defined as the first heating resistor, the heat transfer suppress means is a second heating resistor positioned between the first heating resistor and the support for supporting the first heating resistor, while being electrically insulated from the first heating resistor.

The present invention realizes a thermal gas-flow measuring instrument which can suppress the influence on the output characteristics independent of the use environment, the influence being generated by pollution on the support of the heating resistor.

In addition, with the second heating resistor, the deterioration of output can be avoided, thus the measuring accuracy in the initial state is assured for a long period of time. The deterioration is generated by pollution on the support for supporting the first heating resistor.

DESCRIPTION OF THE PREFERRED EMBODIMENTS

Preferred embodiments of the present invention are described in hereinafter with reference to the drawings.

Figure 1:
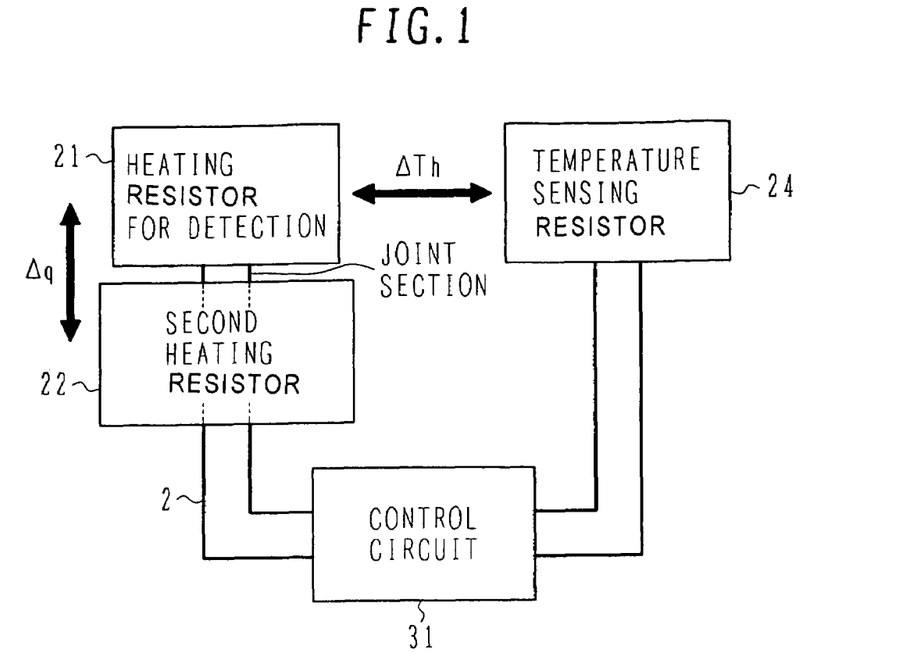
FIG. 1 illustrates the principle of the present invention.
Figure 2:
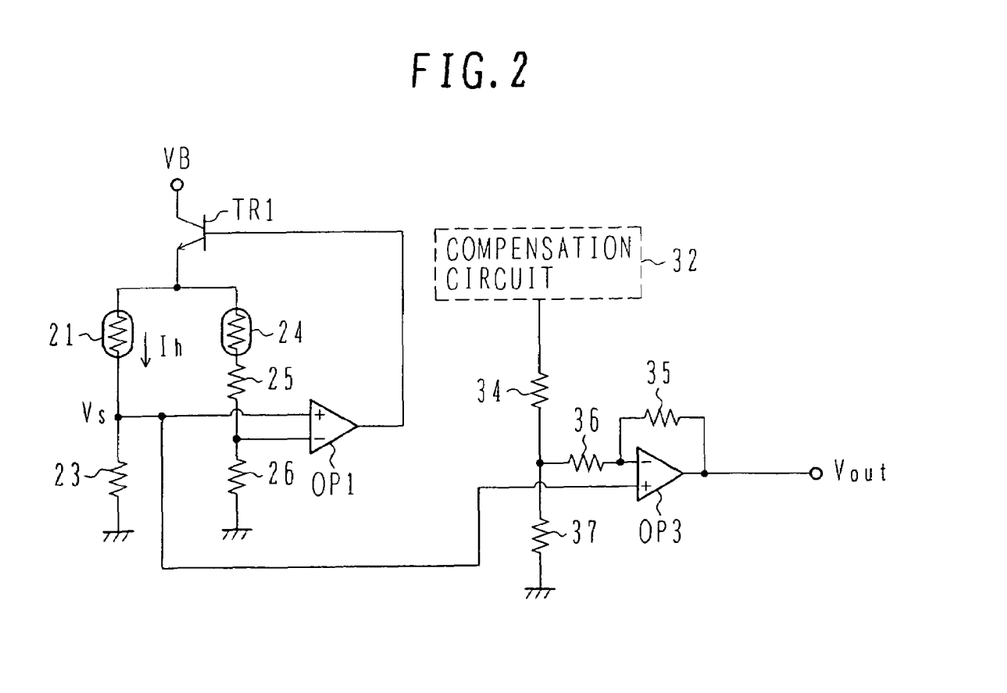
FIG. 2 shows an output circuit diagram for the detected temperature in an embodiment of the present invention.
Figure 3:
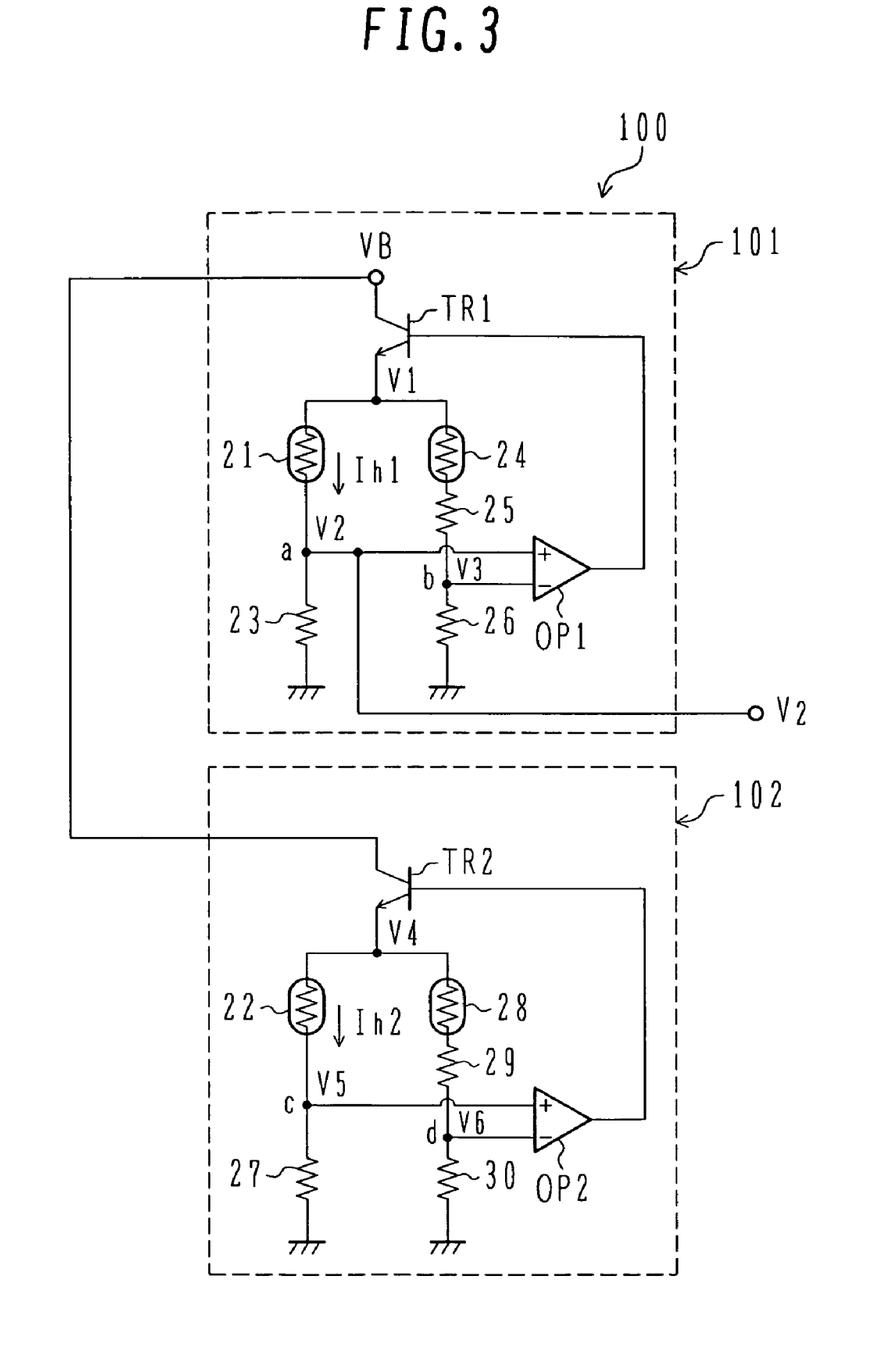
FIG. 3 shows a control circuit diagram in an embodiment of the present invention.
Figure 4:
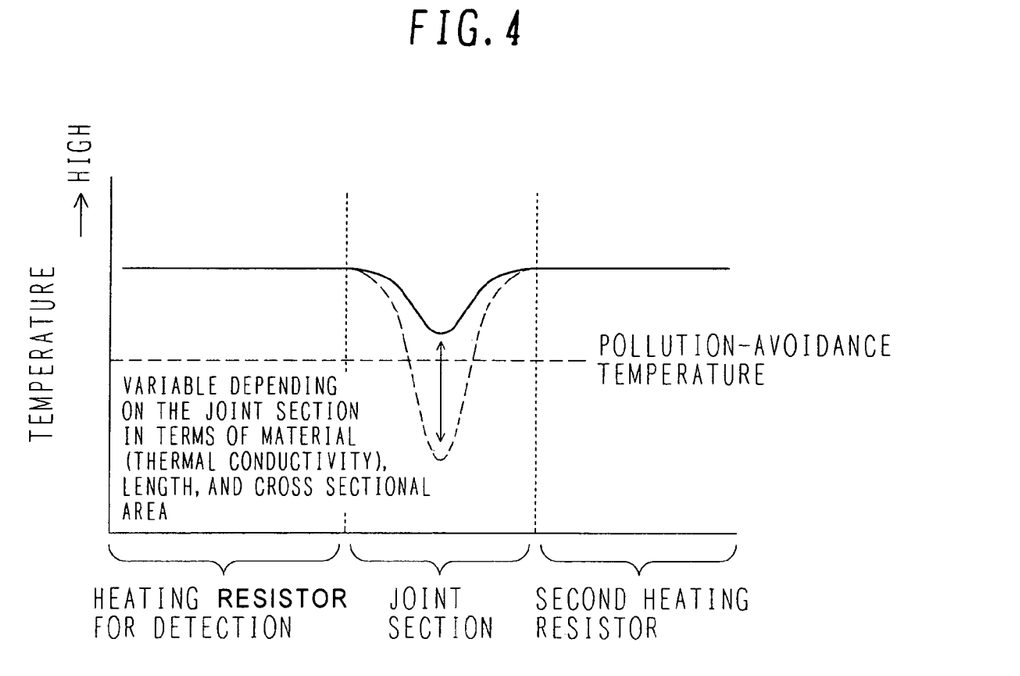
FIG. 4 illustrates causes of temperature variations at the joint section of the first heating resistor and the second heating resistor.
Figure 5:
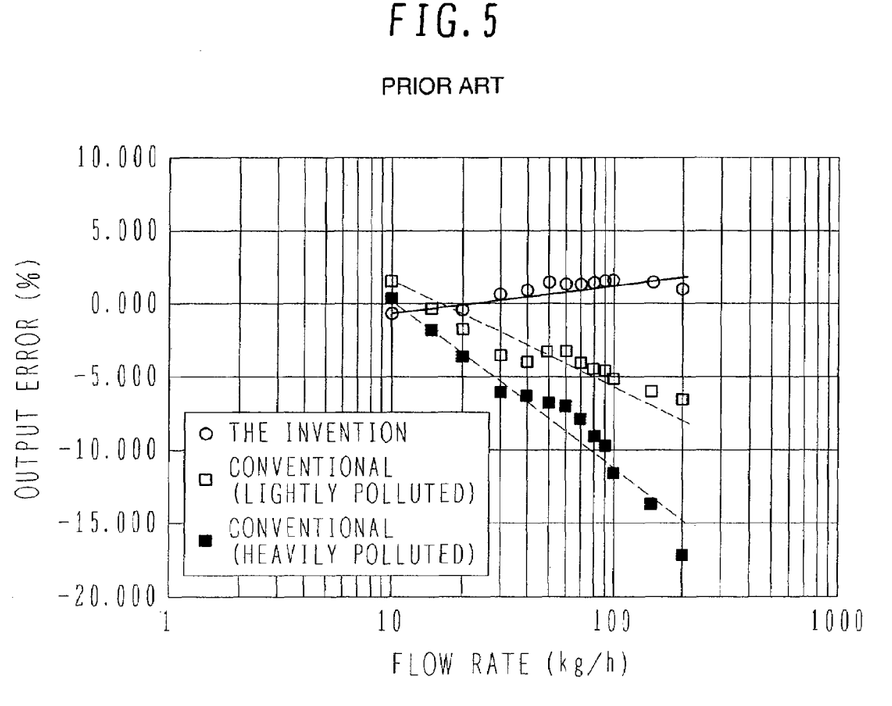
FIG. 5 is a graph showing the effect of the present invention.

FIG. 1 illustrates the principle of the present invention, FIG. 2 showing an output circuit diagram for the detected temperature in a thermal gas-flow measuring instrument of an embodiment of the present invention, FIG. 3 showing a control circuit diagram in an embodiment of the present invention, FIG. 4 illustrating causes of temperature variations at the joint section of the first heating resistor and the second heating resistor, FIG. 5 being a graph showing the effect of the present invention.

Figure 6:
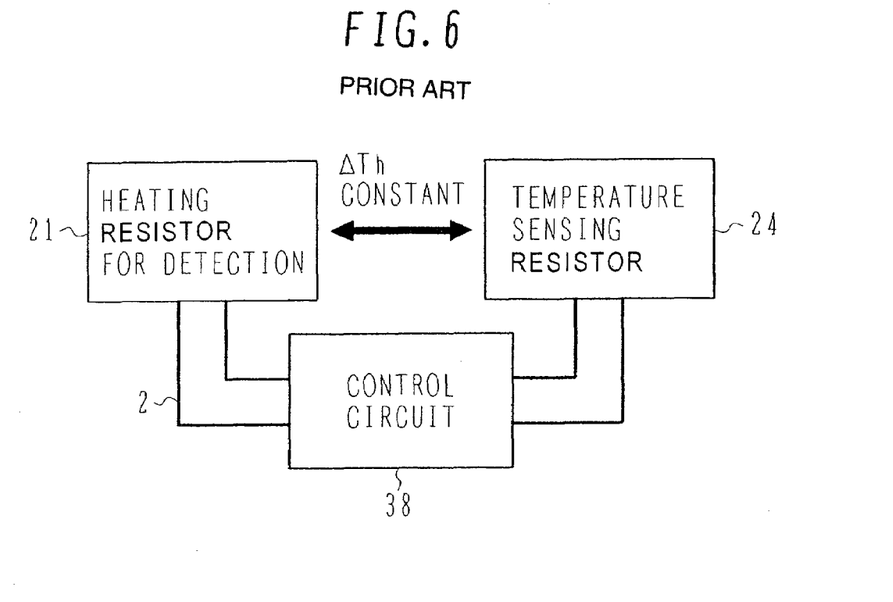
FIG. 6 illustrates the principle of a comparative example different from the present invention.
Figure 7:
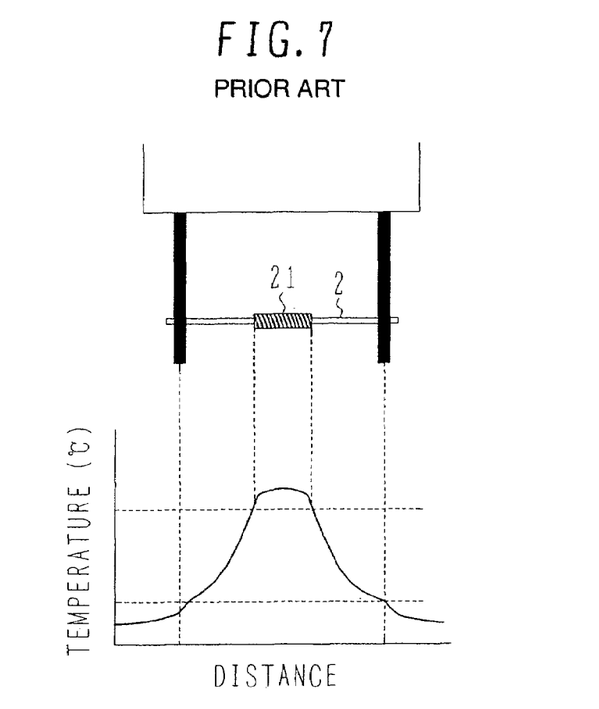
FIG. 7 shows a temperature distribution in a range from the heating resistor to the support in the example of FIG. 6.

FIG. 6 illustrates the principle of a comparative example different from the present invention, FIG. 7 showing a temperature distribution in the heating resistor and the support in the example of FIG. 6.

The comparative example is described prior to describe the principle of the present invention.

Thermal type measuring instrument is to measure the mass flow rate of the gas. Thermal type measuring instrument utilizes two heating resistors. That is, in FIG. 6, the one is a temperature sensing resistor 24 detecting the temperature of the gas, the other one being a detection heating resistor 21 set to a higher temperature (about 200 to 300° C. of operating temperature) than the gas temperature of the sensing resistor 24.

The temperature difference between the temperature sensing resistor 24 and the detection heating resistor 21 is controlled by a control circuit 38 to keep a fixed temperature. Currently, most of the intake flow meters for automobile adopt the type of thermal flow meter.

For a flow meter used either in intake or exhaust environment, the output characteristics is deteriorated by pollution, the deterioration of the output characteristics is a serious problem. Since the structure of sensor detecting the flow rate is provided with a mechanism suppressing the heat transfer from the heating element to the support supporting the heating element in order to ensure an ability of response.

With an example of the structure of detection section of thermal flow meter, FIG. 7 shows a temperature distribution on the heating resistor during heating period. In FIG. 7, since the heat transfer from the heating element 21 to a heating element support 2 is suppressed owing to the sensor structure including the heating resistor support 2, the temperature of the support 2 shows a sudden drop, which causes the pollution.

Although the degree of output deterioration is not singularly defined depending on the operation time after the beginning of the use, operating conditions, and other state, the ultimate error level becomes as large as 5% or more to the initial value.

Figure 8A:
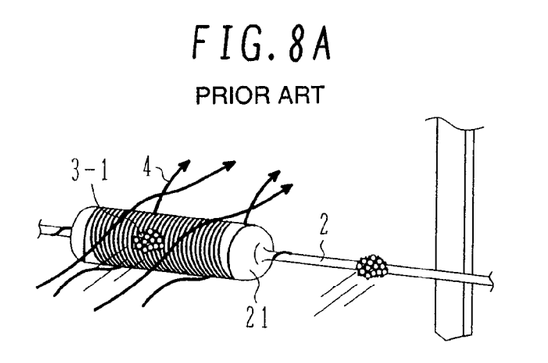
FIGS. 8A to 8C illustrate the cause of pollution occurrence while heating the heating element.
Figure 8B:
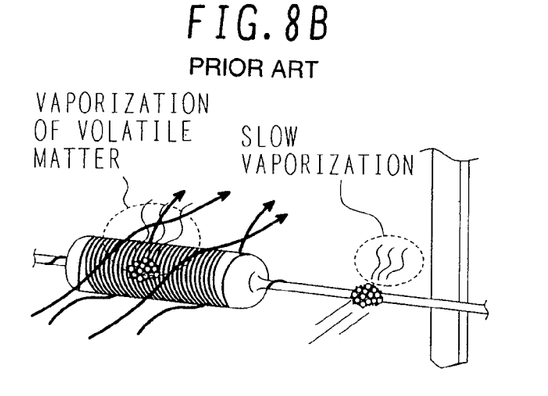
Figure 8C:
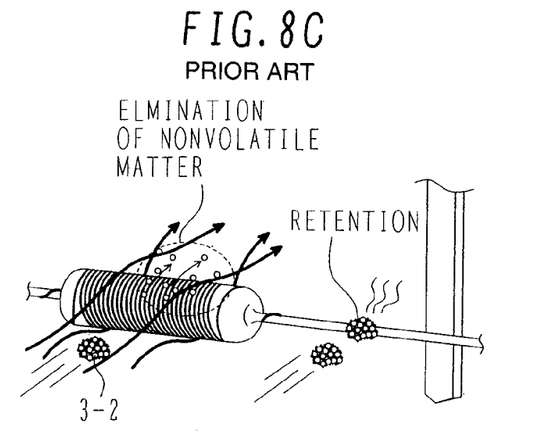

Referring to FIG. 8, the causes of pollution during heating the heating element in exhaust environment are described below.

Specifically in an exhaust environment, the nonvolatile matter such as dry soot and ash existing in particulate matter (PM) discharged from internal combustion engine is the source of pollution. Generation of dry soot comes from the mixing of air taken into the combustion chamber and the fuel injected to the combustion chamber, or insufficient oxidation. Consequently, the emission rate of PM significantly differs with the combustion type.

In particular, diesel internal combustion engine gives self-ignition immediately after the fuel injection, thus the mixing time of fuel and oxygen is short in principle, and the PM is likely generated. As shown in FIG. 8, the sensing section measuring the flow rate is structured by the heating resistor 21 and the support 2 supporting the heating resistor 21.

During actual operation, the control circuit 38 brings the heating resistor 21 to a high temperature. By setting the heating temperature to 350° C. or more, the pollution of the heating resistor 21 can be reduced significantly. That is, the magnitude of pollution strongly relates to the temperature of a body to which the pollutants impinge. Therefore, in actual environment, the following-described phenomena are presumably repeated.

As illustrated in FIGS. 8A to 8C, when PM3-1 existing in the exhaust adheres to the heating resistor 21 heated to a specified high temperature (FIG. 8A), the volatile matter such as soluble organic fractions (SOF) and hydrocarbons (HC) having adhesive power, being included in the PM3-1, is evaporated to disappear by the film boiling under the heat of the heating resistor 21 (FIG. 8B). As a result, the adhesion power of the adhered matter decreases, and the nonvolatile matter represented by the dry soot left on the heating resistor 21 is removed from the surface thereof by the flow of exhaust before succeeding PM arrives, and then the removable matter is carried to downstream side (FIG. 8C). The succeeding PM3-2 also adheres to the heating resistor 21, being evaporated and removed. In actual environment, the above cycles are repeated.

Figure 9:
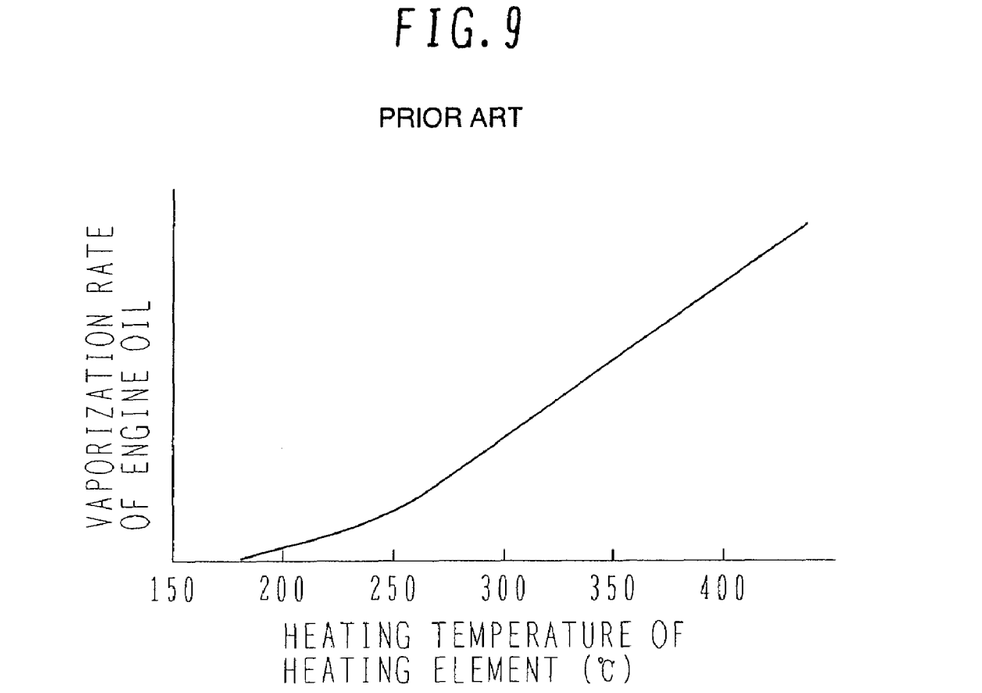
FIG. 9 is a graph showing the relation between the heating temperature of the heating resistor and the evaporation rate of engine oil.

FIG. 9 is a graph showing the relation between the heating temperature of the heating resistor 21 and the evaporation rate of engine oil. The evaporation rate of engine oil increases with the increase of the heating temperature of the heating resistor 21, as shown in FIG. 9. Accordingly, as easily predicted, the volatile matter after PM adhesion is slowly evaporated on the support 2 at a low temperature. Namely, the adhesion power of the nonvolatile matter decreases slowly, so that the nonvolatile matter removal time is delayed, and the further adhesion of succeeding PM increases the deposition, as shown in FIGS. 8A to 8C.

The following is the description of the case supposing an intake environment.

The description begins with the phenomenon that a water droplet on the surface of material is heated to disappear. The phenomenon has four states given below.

(1) Convection: Below the boiling-start temperature, the liquid is heated by convection to evaporate.

(2) Nucleate boiling: Boiling occurs at concavity or projection in the heat transfer plane field, while other sections are in convection condition.

(3) Transition boiling: This is a transition zone from the nucleate boiling to the film boiling.

(4) Film boiling: The total face of heat transfer plane is covered by vapor.

Under the temperature condition of nucleate (transition) boiling, the heat transfer plane contains the portion of boiling in a part and the portion of non-boiling. At the non-boiling portion, the water droplet and the heat transfer plane contact with each other. Under the temperature condition of film boiling, the entire area of the heat transfer plane is covered with vapor so that the heat transfer is small compared with the nucleate boiling. Namely, it is in a not-violent and stable boiling state via a film under the heat conduction within the vapor film.

When the present invention is supposed to be used in an intake environment, a water droplet containing salt and the like and after passing through an air cleaner in an internal combustion engine, for example, contacts with the heating resistor 21. The liquid contacting with the heating resistor 21 disappears in above-described convection, nucleate boiling, transition boiling, or film boiling, depending on the degree of heating, from the surface of the heating resistor 21.

As described above, when the temperature of the heating resistor 21 is at or above the temperature at which the droplet is evaporated to disappear by the film boiling, the water does not adhere to the heating resistor 21 as a water film at a degree equivalent or higher than the case that the surface of the heating resistor 21 is water-repellent or oil-repellent. Furthermore, even when the water droplet stays in a concavity of the heating resistor 21, the surface of the heating resistor 21 and the water droplet are completely isolated by vapor, thus the salt in the water droplet does not adhere to fix onto the surface of the heating resistor 21 but deposits in a mass.

Since the massive salt deposits in a floating state above the surface of the heating resistor 21, it can be blown off if only an intake air flow exists. The effect of water-repellence or oil-repellence by the film boiling phenomenon depends only on the surface temperature so that the similar effect is attained even after a long period of use.

Figure 10:
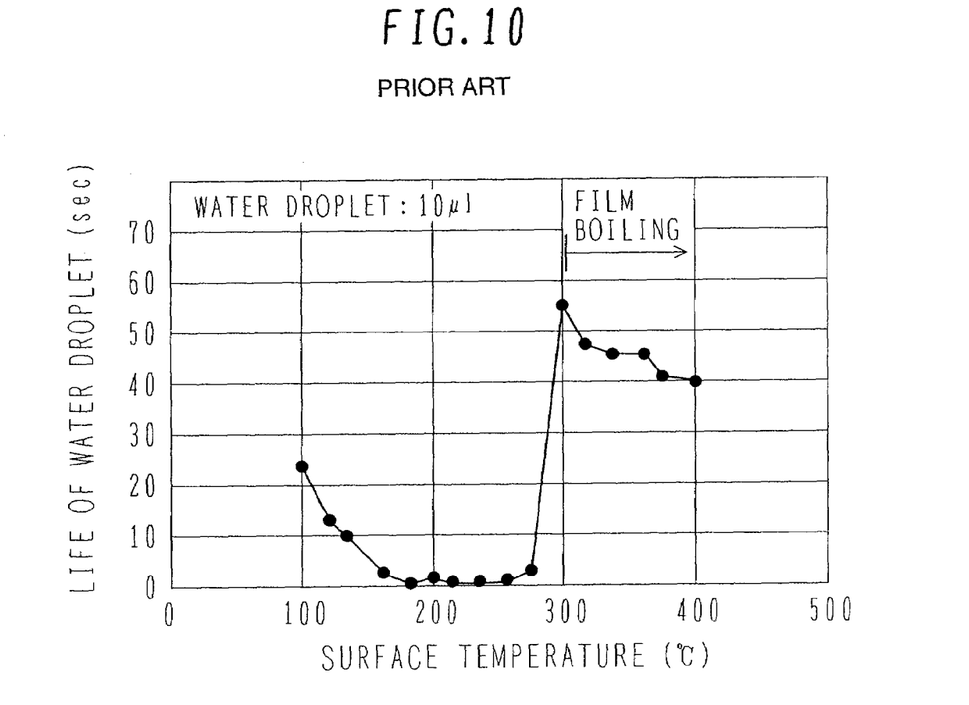
FIG. 10 is a graph showing the relation between the surface temperature and the life of water droplet until it disappears when it is dropped dropwise onto a high temperature plane.

FIG. 10 is a graph showing the relation between the surface temperature and the life of water droplet until it disappears when 10 μl of water droplets containing 3% NaCl are dropped dropwise onto the high temperature surface. As seen in FIG. 10, the droplet is evaporated to disappear in convection, nucleate boiling, and transition boiling, in this order along the increase in the surface temperature, and is evaporated to disappear at 300° C. or above by film boiling.

As described above, the magnitude of phenomena of pollution varies for both the intake and the exhaust under similar reasons with each other. In addition, the set-temperature of a material to avoid the pollution can be selected at a lower level in the intake environment which uses water as the target substance than in the exhaust environment.

The present invention is described below.

FIG. 1 shows an outline of principle configuration of the thermal flow meter as an embodiment of the present invention.

The difference between the present invention shown in FIG. 1 and the example shown in FIG. 6 is the addition of a second heating resistor 22 between the detection heating resistor (the first heating resistor) 21 and the support 2 supporting the first heating resistor 21. The action of the second heating resistor 22 is to keep the heat transfer rate Aq from the heating resistor 21 for flow rate detection to the support 2 to a constant value.

FIG. 2 shows an output circuit diagram according to an embodiment of the present invention. The output circuit diagram has a bridge circuit containing the first heating resistor 21 and the temperature sensing resistor 24, from which circuit the detected temperature is output. In FIG. 2, the heating resistor 21 is connected with a flow detection resistance 23 in series, while the temperature sensing resistor 24 is connected with fixed resistances 25 and 26, in series. The group of the heating resistor 21 and the flow detection resistance 23 and the group of the temperature sensing resistor 24 and the fixed resistances 25 and 26 are connected in parallel each other, thus forming a Wheatstone bridge circuit.

The junction between the heating resistor 21 and the flow detection resistance 23 is connected to a non-reversing input terminal of an Op-Amp OP1. The junction between the fixed resistances 25 and 26 is connected to a reversing input terminal of the Op-Amp OP1.

The output terminal of the Op-Amp OP1 is connected to a base of a transistor TR1. The emitter of the transistor TR1 is connected to the junction between the heating resistor 21 and the temperature sensing resistor 24. The emitter of the transistor TR1 is also connected to a power source VB.

The non-reversing input terminal of the Op-Amp OP1 is connected to a non-reversing input terminal of an Op-Amp OP3. A compensation circuit 32 is grounded via resistances 34 and 37, while the junction between the resistances 34 and 37 is connected to a non-reversing input terminal of the Op-Amp OP3 via a resistance 36. The reversing input terminal of the Op-Amp OP3 is connected to an output terminal of the Op-Amp OP3 via a resistance 35. The output signal of the Op-Amp OP3 becomes a flow detection signal $V_{out}$.

The principle of the thermal flow meter is described below. The total calorific value Ph of the heating resistor 21 is expressed by the formula (1).

$$Ph = Ih^2 \cdot Rh = (A + B\sqrt{(Q)})\Delta Th \quad (1)$$

where, $\Delta Th$ is the difference in temperature between the heating resistor 21 and the gas, A and B are each a thermal constant, Q is the mass flow rate of gas entering the heating resistor 21, Ih is the current to heat the heating resistor 21, and Rh is the value of resistance of the heating resistor 21.

In the formula (1), the A which is a thermal constant expressing the heat conduction from the heating resistor 21 to the support 2, (heat leak). The B is the heat transferred by the target gas. The voltage Vs in FIG. 2, (the voltage at the junction between the heating resistor 21 and the flow detection resistance 23), which is converted into the flow rate is expressed by the formula (2) on the basis of the formula (1).

$$Vs = R1 \cdot Ih = R1 \cdot \sqrt{(1/Rh(A + B\sqrt{(Q)})\Delta Th)} \quad (2)$$

where R1 is the value of resistance of the flow detection resistance 23. As seen from the formula (2), the constants which can vary with the pollution are the A and B of the above-given thermal constants.

The constants of the gas to be measured, except for the mass flow rate Q, are the ones which are not allowed to vary.

Consequently, the adverse affect of pollution to the output can be suppressed by preventing the variations of A and B as the thermal constants. To keep the heat conduction A which is leaked from the heating resistor 21 to the support 2 at a constant value, or to keep the heat transfer Δq at a constant value, the Fourier's law expressed by the formula (3) suggests that it is important to keep the temperature difference between the heating resistor 21 and the support 2 at a constant value.

$$\Delta q = \lambda \cdot C \cdot (\Delta T/\Delta X) \cdot \Delta t \quad (3)$$

where, λ is the heat transfer coefficient, C is the cross sectional area normal to the heat flow, $\Delta T$ is the temperature difference in the moving distance, $\Delta X$ is the moving distance of heat, and $\Delta t$ is the period of time of heat transfer.

By placing the second heating resistor 22 between the heating resistor for detection 21 and the support 2, the heat transfer rate between these two heating resistors 21 and 22 can be kept constant, and the variations in the state on the support 2, or the effect of pollution, can be suppressed.

A control circuit 31 in an embodiment of the present invention is described below referring to FIG. 3.

In FIG. 3, a basic flow detection circuit 101 is the same with the circuit shown in FIG. 2. Therefore, the description about the basic flow detection circuit 101 is not given here.

A sub-heater temperature control circuit 102 has the second heating resistor 22 (with the value of resistance Rh2), a fixed resistance 27 (with the value of resistance R6) connected to the second heating resistor 22 in series, a temperature compensation resistance 28 (with the value of resistance R2), and a fixed resistance 29 (with the value of resistance R4) and a fixed resistance 30 (with the value of resistance R5), which are connected to the temperature compensation resistance 28 in series. The group of the second heating resistor and the fixed resistance 27 and the group of the temperature compensation resistance 28 and the fixed resistances 29 and 30 are connected in parallel each other, thus forming a Wheatstone bridge circuit. The sub-heater temperature control circuit 102 has an operational amplifier (Op-Amp) OP2 to which the potential at c and d positions, respectively, are entered, which c and d positions are the interim points of the respective series circuits forming the Wheatstone bridge circuit, and also has a power transistor TR2 which controls the current being supplied to the above Wheatstone bridge circuit responding to the output of the operational amplifier OP2.

A flow detection circuit 100 supplies the current (at voltage of V1) from the power source VB to the Wheatstone bridge circuit in the basic flow detection circuit 101 via the power transistor TR1. The Wheatstone bridge circuit in the basic flow detection circuit 101 gives voltage of V2 and V3 at the interim points of a and b, of the bridge, respectively, accepting the current from the power source VB. With the functions of the operational amplifier OP1 and the power transistor TR1, the current flowing through the first heating resistor 21 is adjusted so as the voltages of V2 and V3 at the interim points of the bridge, a and b, to become equal with each other.

The first heating resistor 21 increases the value of resistance Rh1 by the temperature rise. The value of resistance Rh1 is proportional to the temperature Th1 of the first heating resistor 21. The temperature Th1 is set to (Th1=Tg+ΔTh1) to bring the Th1 to higher than the target fluid temperature Tg by a certain amount of ΔTh1.

The value of ΔTh1 is set so as the temperature Th1 of the first heating resistor 21 to become higher than the boiling temperature of volatile matter in the dust of the target fluid. That is, the value of resistance Rh1 of the first heating resistor 21 is expressed by the formula (4).

$$Rh1 = Rh10(1 + \alpha 1 \cdot Th1) \quad (4)$$

where, Rh10 is the value of resistance of the first heating resistor 21 at 0° C., and α1 is the temperature coefficient.

The functions of the flow detection circuit 100 of the thermal flow measuring instrument, structured as above-described, in an embodiment of the present invention are described in the following.

When the flow rate of the fluid passing through the first heating resistor 21 of the basic flow detection circuit (hot-wire driving circuit) 101 increases, the heat of the first heating resistor 21 is removed, which induces the reduction in the temperature Th1 of the first heating resistor 21, and the value of voltage V2 at the interim point a of the bridge circuit increases. As a result, the output of the operational amplifier OP1 increases, thus the power transistor TR1 increases the current Ih1 for supplying to the first heating resistor 21 to let the temperature Th1 of the first heating resistor 21 return to the specified value.

Since there is a relation of the formula (2) between the voltage V2 at the interim point "a" of the bridge circuit and the mass flow rate Q of the target fluid, the flow rate Q is determined by the formula (2).

The work of the sub-heater temperature control circuit 102 is described below.

To the Wheatstone bridge circuit of the sub-heater temperature control circuit 102, a current (at voltage V4) is applied from the power source VB via the power transistor TR2.

To the Wheatstone bridge circuit of the sub-heater temperature control circuit 102, a current is applied from the power source VB via the transistor TR2, thus the interim points c and d in the bridge circuit give voltages V5 and V6, respectively. With the functions of the operational amplifier OP2 and the power transistor TR2, the current flowing through the heating resistor 22 is adjusted so as the voltages V5 and V6 at the interim points c and d of the bridge circuit to become equal with each other.

The second heating resistor 22 increases the value of resistance Rh2 with the temperature rise. The value of resistance Rh2 is proportional to the temperature Th2 of the second heating resistor 22. The temperature Th2 is set to (Th2=Tg+ΔTh2) to bring the Th2 to higher than the fluid temperature Tg by a certain amount of ΔTh2.

The value of ΔTh2 is set to become higher than the temperature set value ΔTh1 of the first heating resistor 21 of the basic flow detection circuit 101. For example, ΔTh2=150° C. to ΔTh1=100° C. That is, in this circuit structure, the temperature Th2 of the second heating resistor 22 is always set to higher value than the temperature Th1 of the first heating resistor 21.

In the embodiment of the present invention, it is important to establish a state that can avoid the pollution of a zone between the first heating resistor for detection 21 and the second heating resistor 22 because, once the pollution occurs in the zone, the heat transfer B by the target gas varies.

As illustrated in FIG. 4, the temperatures in the first heating resistor 21, the second heating resistor 22, and the zone (the joint section in FIG. 4) vary with the material, distance, or cross sectional area of the above zone, following the formula (3). However, by setting the temperatures of two heating resistors 21 and 22 to at or above the temperature necessary to avoid the pollution, and by shortening the distance between these two heating resistors 21 and 22, the temperature of the above zone is able to be kept at or above the temperature necessary to avoid the pollution, (broken line to solid line in FIG. 4), and the heat transfer from the target gas can be maintained at the initial state.

The term "temperature to avoid the pollution" referred to herein is, as described before, for example, 300° C. or above in intake environment and 350° C. or above in exhaust environment. For the temperatures of the heating resistors 21 and 22, the high/low level between them is arbitrary if only the above requirements are satisfied, and equal temperature between them also does not raise problem.

It is also possible to control the temperature range of the second heating resistor 22 to become at or above the temperature at which the water droplet contacting the surface of the first heating resistor 21 evaporates to disappear by the film boiling.

It is also possible to set the temperature of the first heating resistor 21 and the temperature of the second heating resistor 22 so as the temperature range in the zone between the first heating resistor 21 and the second heating resistor 22 to become at or above the temperature at which the water droplet contacting the surface of the zone evaporates to disappear by the film boiling.

Alternatively, it is possible to control the temperature of the first heating resistor 21 and the temperature of the second heating resistor 22 so as the heat transfer rate between the first heating resistor 21, the temperature sensing resistor 24, and the second heating resistor 22 to keep a constant value independent of the temperature variations in the gas.

Furthermore, it is possible to perform control so as the heat transfer rate between the first heating resistor 21 and the temperature sensing resistor 24 to keep a constant value, and so as the temperature of the second heating resistor 22 to keep a constant value independent of the temperature variations in the gas.

The experimental results relating to the effect of the present invention are described below referring to FIG. 5.

The graph of FIG. 5 is drawn with the mass flow rate of the gas in the horizontal axis, and the output error in the vertical axis. The structure of the technology in the related art shown in FIG. 5, given by open square (□), generates about 7% of output error caused by a slight pollution. Increase in the pollution generates greater error, as shown by closed square (■) (heavily polluted state).

On the other hand, according to the structure of the present invention having the second heating resistor 22, the output error is significantly reduced from that of the related art, giving 2% or lower output error in similar state with that of the lightly polluted condition in the related art. Taking into account that the test result contains the error generated by the measuring system, the present invention reproduces the initial characteristics. The test result given in FIG. 5 proved the effect of the present invention.

Concrete examples of the sensor structure that realize the present invention are described below.

FIGS. 11A, 11B, 12A and 12B illustrate examples of the structure of the sensor according to the present invention.

Figure 11A:
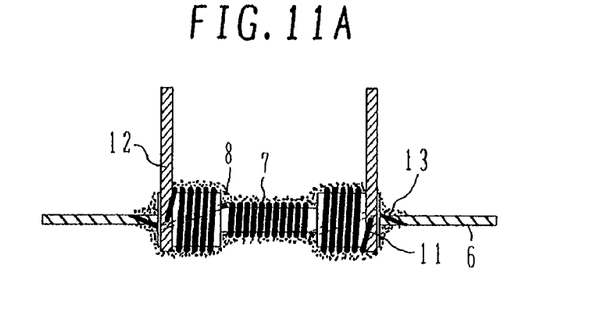
FIGS. 11A and 11B illustrate an example of the structure of a sensor according to an embodiment of the present invention.
Figure 11B:
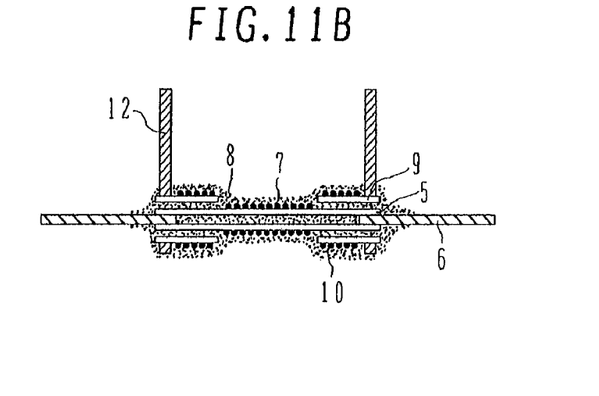

FIGS. 11A and 11B show the first sensor structure, showing appearance in FIG. 11A, and rough cross sectional drawing in FIG. 11B.

Regarding FIG. 11A and 11B, in the heating resistor for detection (first heating resistor) 21, an alumina pipe 5 as the substrate and a support 6(2) for supporting the alumina pipe 5 are joined together by a highly heat resistive material such as heat-resistant glass. To each end of the hollow section of the alumina pipe 5, each end portion of the respective supports 6 is inserted. To the zone where the ends of the respective supports 6 face each other in the hollow section of the alumina pipe 5, a heat-resistant glass, for example, is filled.

On the outer surface of the alumina pipe 5, there is formed a Pt wire (coil) as the first heating resistor by winding thereon. Furthermore, a glass film 8 for insulation and protection is formed on the Pt wire coil. Each end 13 of the Pt wire 7 is connected to the support 6.

Further, at each end of the alumina pipe 5, there is placed an alumina pipe 9 as the substrate of the second heating resistor 22 via the glass film 8, and further a second coil 10, and a glass film 8 are formed successively thereon. Each end 11 of the second coil 10 is welded and fixed to each support 12 of the second coil 10, arranged on each end portion of the alumina pipe 9. Specifically, the coil 7 has an increased winding interval in the zone overlapping the second coil 10.

Figure 12A:
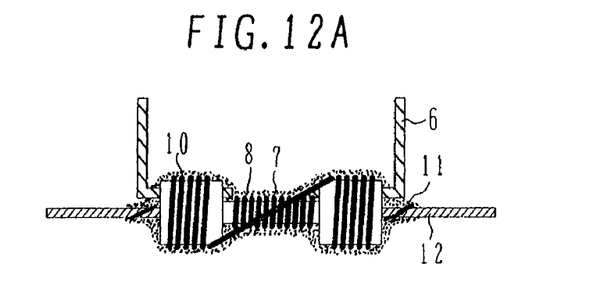
FIGS. 12A and 12B illustrate another example of the structure of a sensor according to an embodiment of the present invention.
Figure 12B:
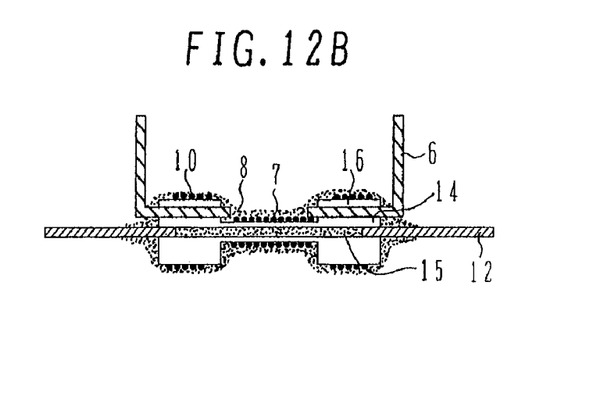

The second sensor structure shown in FIGS. 12A and 12B is described below. FIG. 12A shows the appearance, and FIG. 12B shows the rough cross sectional. The second sensor has a structure of integrating the alumina pipes 5 and 9 in FIGS. 11A and 11B.

A through hole 15 formed at the center axis of an alumina pipe 14 integrating the alumina pipes 5 and 9 is used as an insertion hole of a support 12 of the second coil 10, while the support 6 of the detection coil 7 is inserted into a through hole 16 formed adjacent to the through hole 15.

With the configuration, the second coils 10 formed on both ends of the alumina pipe are connected each other jumping over the detection coil 7 to create a coil under the condition that the second coil 10 does not contact with the detection coil 7 positioned therebetween. The sensor is fully covered with the glass film 8.

The problems arisen along with the progress of pollution include the following-described ones other than the above-described output error cause.

Figure 13A:
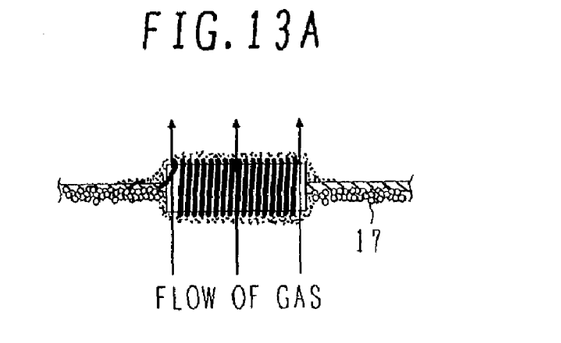
FIGS. 13A and 13B illustrate the output error cause which may appear during the progress of the pollution.
Figure 13B:
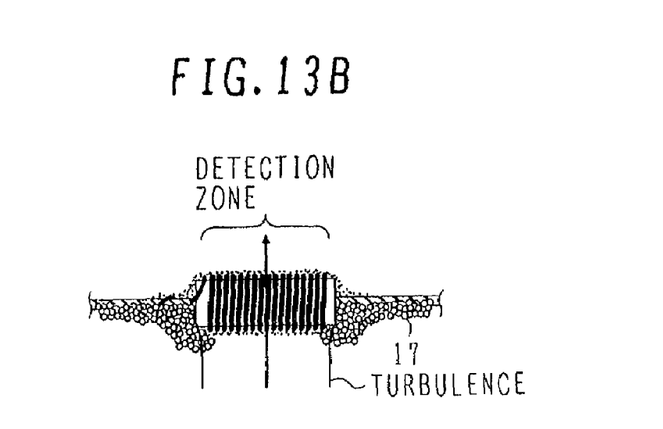

In the related art, after a certain period of time has passed from the beginning of use of the thermal gas-flow measuring instrument, dry soot 17 begins to deposit on the low temperature support, as shown in FIG. 13A. When the time is further elapsed to progress the pollution, deposit covers both ends of the detection zone in some cases, as shown in FIG. 13B, because the PM volatile matter in the exhaust has very strong adhesion power.

Once that state is established, turbulence occurs owing to the soot deposition, and the flow of target gas in the detection zone, or over the heating resistor 21, varies from the state immediately after beginning the use of the instrument. Since the heat release which may occur between the target gas and the support varies from the state immediately after beginning the use of the instrument, an output error occurs.

Figure 14:
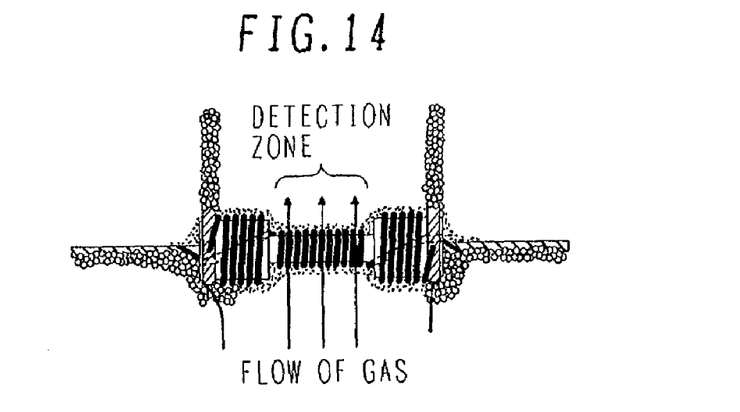
FIG. 14 illustrates the effect of suppressing the output error cause during the progress of pollution according to the present invention.

To the contrary, as shown in FIG. 14, with the structure of sensor according to the present invention, placing the second heating resistor 22 as the insulation means between the first heating resistor 21 and the support, the existence of the second heating resistor 22 smoothens the turbulence of gas-flow in the detection zone, which turbulence comes from the pollution.

In this case, although the variations in gas-flow to the second heating resistor 22 are unavoidable, no effect on the output appears because the first heating resistor 21 and the second heating resistor 22 are electrically insulated from each other.

What is claimed is:

1. A thermal gas-flow measuring instrument comprising:
   a first heating resistor placed in a gas to be measured in an exhaust atmosphere;
   a temperature sensing resistor positioned at upstream side or downstream side of the heating resistor, for measuring the flow rate of the gas; and
   a second heating resistor to suppress the heat transfer from the heating resistor to a support for supporting the first heating resistor;
   wherein the second heating resistor is positioned between the first heating resistor and the support for supporting the first heating resistor, and the second heating resistor is electrically insulated from the first heating resistor; and
   wherein the temperature of the first heating resistor and the temperature of the second heating resistor are set so that the temperature range in a zone between the first heating resistor and the second heating resistor becomes at or above the temperature at which a water droplet contacting with the surface of the zone is evaporated to disappear by film boiling.

2. A thermal gas-flow measuring instrument according to claim 1, wherein the temperature range of the second heating resistor is set to at or above the temperature at which a water droplet contacting with the surface of the first heating resistor is evaporated to disappear by film boiling.

3. A thermal gas-flow measuring instrument according to claim 1, wherein the temperature of the first heating resistor and the temperature of the second heating resistor are controlled so that the heat transfer rate among the first heating resistor, the temperature sensing resistor, and the second heating resistor becomes a constant value independent of the temperature variations in the gas.

4. A thermal gas-flow measuring instrument according to claim 1, wherein there is applied control so that the heat transfer rate between the first heating resistor and the temperature sensing resistor is kept constant independent of the temperature variations in the gas, and so that the temperature of the second heating resistor is kept constant.

5. A thermal gas-flow measuring instrument according to claim 1, further comprising a control means in which the first heating resistor is connected with a first temperature sensing resistor in parallel with each other to form a first bridge circuit, and the second heating resistor is connected with a second temperature sensing resistor in parallel with each other to form a second bridge circuit, thereby controlling the first heating resistor to become a first constant temperature, while controlling the second heating resistor to become a second constant temperature.

6. A thermal gas-flow measuring instrument according to claim 1, wherein the first heating resistor is positioned at a center of a surface of a first cylindrical member, the second heating resistor is positioned at a surface of a second cylindrical member which is positioned at each end of the surface of the first cylindrical member, and the support of the first heating resistor is connected to near each end of a hollow section of the cylindrical member.

7. A thermal gas-flow measuring instrument according to claim 6, wherein the first heating resistor and the second heating resistor are protected by insulation with a glass film.

8. A thermal gas-flow measuring instrument according to claim 1, wherein the first heating resistor is positioned at a center of a surface of a cylindrical member, the second heating resistor is positioned at a surface of each end of the cylindrical member, and the support of the first heating resistor is connected to near each end of the cylindrical member.

9. A thermal gas-flow measuring instrument according to claim 1, wherein the first heating resistor and the second heating resistor are protected by insulation with a glass film.

10. A thermal gas-flow measuring instrument comprising:
a first heating resistor placed in a gas to be measured in an exhaust atmosphere;
a temperature sensing resistor positioned at upstream side or downstream side of the heating resistor, for measuring the flow rate of the gas; and
a second heating resistor to suppress the heat transfer from the heating resistor to a support for supporting the first heating resistor;
wherein the second heating resistor is positioned between the first heating resistor and the support for supporting the first heating resistor, and the second heating resistor is electrically insulated from the first heating resistor; and
wherein the temperature of the first heating resistor and the temperature of the second heating resistor are controlled so that the heat transfer rate among the first heating resistor, the temperature sensing resistor, and the second heating resistor becomes a constant value independent of the temperature variations in the gas.

11. A thermal gas-flow measuring instrument according to claim 10, wherein the temperature range of the second heating resistor is set to at or above the temperature at which a water droplet contacting with the surface of the first heating resistor is evaporated to disappear by film boiling.

12. A thermal gas-flow measuring instrument according to claim 10, further comprising a control means in which the first heating resistor is connected with a first temperature sensing resistor in parallel with each other to form a first bridge circuit, and the second heating resistor is connected with a second temperature sensing resistor in parallel with each other to form a second bridge circuit, thereby controlling the first heating resistor to become a first constant temperature, while controlling the second heating resistor to become a second constant temperature.

13. A thermal gas-flow measuring instrument according to claim 10, wherein the first heating resistor is positioned at a center of a surface of a first cylindrical member, the second heating resistor is positioned at a surface of a second cylindrical member which is positioned at each end of the surface of the first cylindrical member, and the support of the first heating resistor is connected to near each end of a hollow section of the cylindrical member.

14. A thermal gas-flow measuring instrument according to claim 10, wherein the first heating resistor is positioned at a center of a surface of a cylindrical member, the second heating resistor is positioned at a surface of each end of the cylindrical member, and the support of the first heating resistor is connected to near each end of the cylindrical member.

15. A thermal gas-flow measuring instrument according to claim 10, wherein the first heating resistor and the second heating resistor are protected by insulation with a glass film.

16. A thermal gas-flow measuring instrument comprising:
a first heating resistor placed in a gas to be measured in an exhaust atmosphere;
a temperature sensing resistor positioned at upstream side or downstream side of the heating resistor, for measuring the flow rate of the gas; and
a second heating resistor to suppress the heat transfer from the heating resistor to a support for supporting the first heating resistor;
wherein the second heating resistor is positioned between the first heating resistor and the support for supporting the first heating resistor, and the second heating resistor is electrically insulated from the first heating resistor; and
wherein the first heating resistor and the temperature sensing resistor are controlled so that the heat transfer rate between the first heating resistor and the temperature sensing resistor becomes a constant value independent of the temperature of the gas, and so that the temperature of the second heating resistor becomes a constant value independent of temperature variations in the gas.

17. A thermal gas-flow measuring instrument according to claim 16, wherein the temperature range of the second heating resistor is set to at or above the temperature at which a water droplet contacting with the surface of the first heating resistor is evaporated to disappear by film boiling.

18. A thermal gas-flow measuring instrument according to claim 16, further comprising a control means in which the first heating resistor is connected with a first temperature sensing resistor in parallel with each other to form a first bridge circuit, and the second heating resistor is connected with a second temperature sensing resistor in parallel with each other to form a second bridge circuit, thereby controlling the first heating resistor to become a first constant temperature, while controlling the second heating resistor to become a second constant temperature.

19. A thermal gas-flow measuring instrument according to claim 16, wherein the first heating resistor is positioned at a center of a surface of a first cylindrical member, the second heating resistor is positioned at a surface of a second cylindrical member which is positioned at each end of the surface of the first cylindrical member, and the support of the first heating resistor is connected to near each end of a hollow section of the cylindrical member.

20. A thermal gas-flow measuring instrument according to claim 16, wherein the first heating resistor is positioned at a center of a surface of a cylindrical member, the second heating resistor is positioned at a surface of each end of the cylindrical member, and the support of the first heating resistor is connected to near each end of the cylindrical member.

* * * * *